United States Patent
Ramaswamy

(10) Patent No.: US 10,711,928 B2
(45) Date of Patent: Jul. 14, 2020

(54) HOSE CONNECTION

(71) Applicant: EATON INDUSTRIAL IP GBMH & CO. KG, Schoenefeld (DE)

(72) Inventor: Swaminathan Ramaswamy, Chennai (IN)

(73) Assignee: EATON INTELLIGENT POWER LIMITED, Dublin (IE)

(*) Notice: Subject to any disclaimer, the term of this patent is extended or adjusted under 35 U.S.C. 154(b) by 450 days.

(21) Appl. No.: 15/107,477

(22) PCT Filed: Dec. 19, 2014

(86) PCT No.: PCT/EP2014/078719
§ 371 (c)(1),
(2) Date: Jun. 23, 2016

(87) PCT Pub. No.: WO2015/097084
PCT Pub. Date: Jul. 2, 2015

(65) Prior Publication Data
US 2016/0319973 A1    Nov. 3, 2016

Related U.S. Application Data

(60) Provisional application No. PCT/EP2014/078719, filed on Dec. 19, 2014.

(30) Foreign Application Priority Data

Dec. 23, 2013 (GB) .................................. 1322863.0

(51) Int. Cl.
*F16L 33/207*    (2006.01)
*F16L 33/34*     (2006.01)

(52) U.S. Cl.
CPC ....... *F16L 33/2076* (2013.01); *F16L 33/2073* (2013.01); *F16L 33/34* (2013.01)

(58) Field of Classification Search
CPC .... F16L 33/2073; F16L 33/2076; F16L 33/34
(Continued)

(56) References Cited

U.S. PATENT DOCUMENTS 5,387,016 A    2/1995  Joseph et al.
7,249,787 B1*  7/2007  Chisnell .............. F16L 33/2076
                                                    285/256

(Continued)

FOREIGN PATENT DOCUMENTS

DE    4315175 A1    11/1994
EP    0100170 A1     2/1984
(Continued)

OTHER PUBLICATIONS

International Search Report of PCT/EP2014/078719, dated Apr. 27, 2015, pp. 1-5.

*Primary Examiner* — Zachary T Dragicevich
(74) *Attorney, Agent, or Firm* — Leydig, Voit & Mayer, Ltd.

(57) ABSTRACT

A hose connection has: a tubular body with a first end and a second end; a shrink sleeve arranged around the first end of the tubular body for crimping and thereby clamping a hose end on the first end of the tubular body; and an adhesive layer arranged on the outer surface of the first end of the tubular body and at least enveloping the first end in tangential direction.

10 Claims, 3 Drawing Sheets

(58) Field of Classification Search
USPC ............ 285/256, 294.1, 381.1, 381.2, 381.3, 285/381.4, 381.5
See application file for complete search history.

(56) References Cited

U.S. PATENT DOCUMENTS

| | | | |
|---|---|---|---|
| 2005/0001424 A1* | 1/2005 | Watanabe | ........... F16L 33/2073 285/256 |
| 2005/0062282 A1 | 3/2005 | Rosch et al. | |
| 2008/0136176 A1* | 6/2008 | Katayama | ........... F16L 33/2073 285/256 |
| 2011/0221184 A1* | 9/2011 | Lefere | ................. F16L 33/2073 285/256 X |

FOREIGN PATENT DOCUMENTS

| | | | |
|---|---|---|---|
| EP | 1505328 | A2 | 2/2005 |
| EP | 2378173 | A2 | 10/2011 |
| GB | 1180915 | A | 2/1970 |
| GB | 1483143 | A | 8/1977 |
| IT | 20110882 | A1 | 11/2012 |
| JP | 2010031974 | A | 2/2010 |
| WO | WO 9211997 | A1 | 7/1992 |
| WO | WO 2008107920 | A1 | 9/2008 |
| WO | WO 2013103617 | A1 | 7/2013 |

\* cited by examiner

HOSE CONNECTION

CROSS-REFERENCE TO RELATED APPLICATIONS

This application is a U.S. national stage application under 35 U.S.C. § 371 of International Application No. PCT/EP2014/078719, filed on Dec. 19, 2014, and claims benefit to British Patent Application No. 1 322 863.0, filed on Dec. 23, 2013. The International Application was published in English on Jul. 2, 2015, as WO 2015/097084 A1 under PCT Article 21(2).

FIELD

The invention relates to a hose connection having: a tubular body.

BACKGROUND

Hose connections are well known in for example hydraulic applications, like air-conditioning systems. The hose connection is used to connect a hose to another hose assembly or to a waste energy harnessing device such as a heat exchanger or heat pump. The tubular body is typically a metal body on which the hose is pushed. The shrink sleeve is then shrunk by exerting a clamping force or radial compression force along the entire circumference, to clamp or radially compress the hose on the end of the tubular body and to provide a leak tight connection between the hose and the tubular body.

In order for the hose connection be leak tight at a given pressure, the clamping force by the shrink sleeve should at least reach a certain minimum. This minimum clamping force or radial compression force, could however be higher than the structural strength of the tubular body and it could cause a collapse of the tubular body. This would create a constriction in the flow path.

One could improve the strength of the tubular body by increasing the wall thickness of the body, but this would then increase the outer diameter of the body and accordingly require hoses with a larger diameter. One could also reduce the inner diameter of the tubular body, but this will create a restriction in the flow.

Another possibility of improving the structural strength of the tubular body is by choosing another material with a higher strength for the body. This has however impact on the material costs, the manufacturing technique and so on. For example, if the tubular body could be made of plastic by injection molding, the costs would be lower, than when the tubular body has to be made by turning a metal bar or by extruding a tube.

SUMMARY

An aspect of the invention provides a hose connection, comprising: a tubular body including a first end and a second end; a shrink sleeve arranged around the first end of the tubular body configured to clamp a hose end on the first end of the tubular body; and an adhesive layer arranged on an outer surface of the first end of the tubular body, the adhesive layer at least enveloping the first end in tangential direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
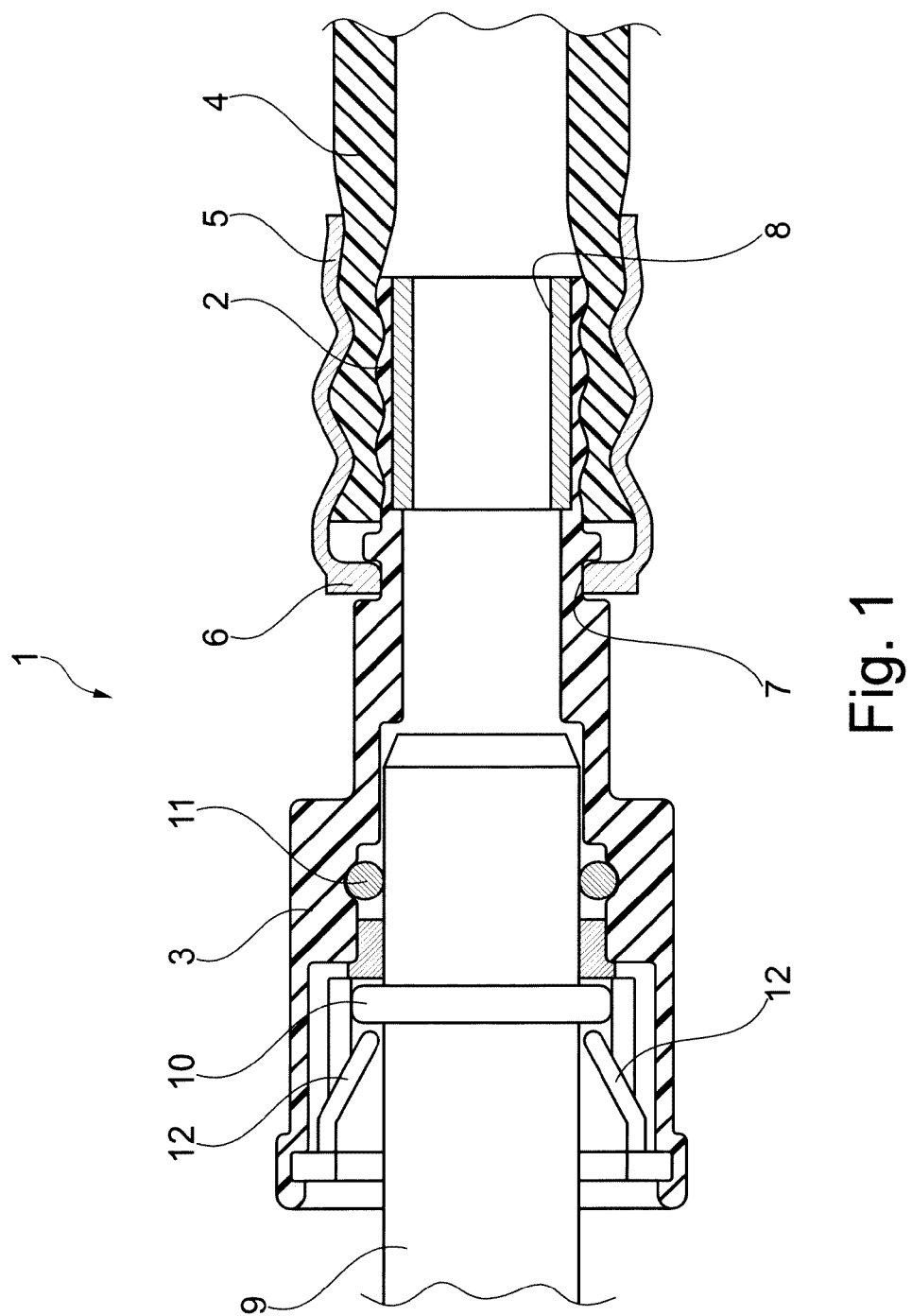
FIG. 1 shows a cross sectional view of an embodiment of the hose connection according to the invention.

An aspect of the invention relates to a hose connection comprising:
a tubular body with a first end and a second end; and
a shrink sleeve arranged around the first end of the tubular body for clamping a hose end on the first end of the tubular body.

It is an aspect of the invention to reduce or even remove the above mentioned disadvantages in the art.

In an embodiment, the invention provides a hose connection characterized by an adhesive layer arranged on the outer surface of the first end of the tubular body and at least enveloping the first end in tangential direction.

Preferably, the adhesive layer extends in longitudinal direction over the area where clamping force or radial compression force is applied to the shrink sleeve.

With the adhesive layer the clamping force, or radial compression force, exerted by the shrink sleeve can be reduced while maintaining the required leak tightness. The adhesive layer provides an additional sealing layer, as it envelopes the first end in tangential direction and along the length where radial clamping force or compression force is applied on the shrink sleeve. So, the pressure of the hose on the first end of the tubular body can be lower, as the reduced sealing function of the hose itself is supplemented by the adhesive layer.

The adhesive layer also contributes to the pull strength of the hose connection. Without the adhesive layer, the pull strength is determined by the friction force between the hose and the tubular body. If the clamping force or radial compression force, by the shrinking sleeve is reduced, this friction force is also reduced. However, the adhesive layer increases the friction between the hose and the tubular body, such that the resulting pull strength is maintained or even improved.

In a preferred embodiment of the hose connection according to the invention the adhesive layer extends at least within the radial projection of the shrink sleeve. When a hose is connected, the hose pre-assembled with the shrink sleeve will be pushed over the first end of the tubular body. As the adhesive layer extends at least within the radial projection of the shrink sleeve, it is ensured, that when the hose pre-assembled with the shrink sleeve is pushed over the first end of the tubular body, the hose will be in contact with the adhesive layer.

In a further preferred embodiment of the hose connection according to the invention parallel annular ridges are arranged on the outer surface of the first end of the tubular body.

The ridges will provide local pressure zones when the shrink sleeve is clamped around the hose end improving the leak tightness and the pull strength of the hose connection.

It is preferred that the outer surface of the first end and the parallel ridges form an undulating outer surface. The undulating outer surface provides the local pressure zones, while providing a smooth surface, such that the inner surface of the hose deforms into the ridges and will be in full contact with the outer surface of the first end of the tubular body and the adhesive layer.

Yet another embodiment of the hose connection according to the invention further comprises a bushing arranged against the internal surface of the first end of the tubular body.

The bushing provides additional strength to the first end of the tubular body and prevents any collapse due to a radial clamping force or compression force for squeezing the hose over the first end of the tubular body. By providing a separate element, it is possible to tune the material properties of the bushing and the tubular body to their particular requirements. For example the tubular body could be made of a plastic to reduce material costs, while the bushing could be made of metal to provide additional strength.

In still a further preferred embodiment of the hose connection according to the invention the tubular body is injection molded. With injection molding, the tubular body can be made cost effective, while having a relative complex shape. It would for example be possible to provide the other, second end of the tubular body with a snap connection, in which a further tube with its formed end can be sealingly snap connected.

In a further embodiment of the hose connection according to the invention an annular groove is arranged at a distance from the outer end of the first end of the tubular body and wherein the shrink sleeve comprises a radial flange extending inwardly and into the annular groove.

In this embodiment, the shrink sleeve contributes to the pull strength of the hose connection as the radial flange of the sleeve is coupled with the annular groove in the tubular body.

The invention also relates to a method for manufacturing a hose connection according to the invention, which method comprises the steps of:
- providing a tubular body with a first end and a second end;
- subjecting the outer surface of the first end of the tubular body with a plasma treatment;
- coating the outer surface of the first end with an adhesive; and
- providing and arranging a shrink sleeve around the first end of the tubular body.

According to the invention the first end of the tubular body is subjected to a plasma treatment. This plasma treatment improves the roughness and wettability of the outer surface, such that the afterwards arranged adhesive layer will adhere better. This is in particular the case when the tubular body is manufactured out of plastic materials that are hydrophobic in nature.

The plasma treatment could be provided by any suitable method, such as a gas blown arc plasma or a surface dielectric barrier discharge plasma. The adhesive layer can also be provided by any suitable method, such as adhesive spraying or adhesive dipping.

In a preferred embodiment of the method according to the invention the surface strength of the outer surface of the first end of the tubular body after plasma treatment is $10^{-6}$ Nm (10 dyne·cm) greater than the surface strength of the adhesive layer.

The plasma treatment preferably is adjusted to match the used adhesive, such that a sufficient adherence of the adhesive on the outer surface of the first end of the tubular body is obtained.

FIG. 1 shows a cross sectional view of an embodiment of the hose connection 1 according to the invention. The hose connection 1 has a tubular body 2, 3 with a first end 2 and a second end 3. A hose end 4 is pushed over the first end 2 of the tubular body 2, 3 and clamped by a shrink sleeve 5.

The shrink sleeve 5 has a radial flange 6, which extends in the annular groove 7 arranged in the first end 2.

A bushing 8 is arranged against the internal surface of the first end 2 of the tubular body 2, 3. The bushing 8 provides additional strength to the first end 2 to prevent collapse of the first end 2, when the shrink sleeve 5 is shrunk around the hose end 4.

The second end 3 of the tubular body 2, 3 is provided with a snap connection for connecting the hose connection 1 to a steel tube 9, which is provided with a flange 10. An O-ring 11 is arranged on the inside of the second end 3 of the tubular body 2, 3 to provide a leak tight connection. Flexible fingers 12 are provided, which snap behind the bulge 10 to prevent the steel tube 9 from disconnecting from the hose connection 1, but allow the steel tube 9 to be easily inserted into the hose connection 1.

By providing the snap-to-connect function at the second end of the tubular body 2, 3, added advantage is introduced to integrate another hose assembly or waste heat recovery device like a heat exchanger or heat pump without any assembly constraints. In case a hose connection tube and a heat exchanger inner tube are in one single piece, especially when there is a short bend at some distance from the hose clamped connection and near the heat exchanger end where the tubes are joined by brazing, a snap-to connection has a considerable advantage.

Additionally by having the snap-to-connect mechanism, the hose connection will not be influenced by the heat of the brazing operation involved in the heat exchanger assembly sequence.

Figure 2:
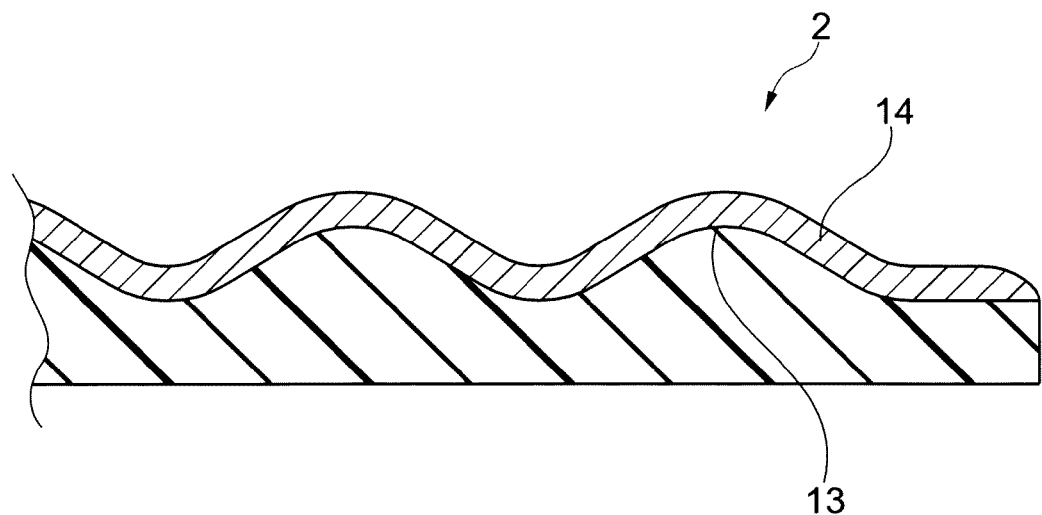
FIG. 2 shows a detailed view of a part of FIG. 1.

FIG. 2 shows a detailed view of the first end 2 of the tubular body 2, 3. The outer surface 13 of the first end 2 is provided with an undulating outer surface 13 on which an adhesive layer 14 is arranged. The adhesive layer 14 provides for additional sealing and for an increase of the friction. This enables a lower clamping force by the shrink sleeve 5, while maintaining the required leak tightness and the required pull force of the hose connection 1.

Figure 3A:
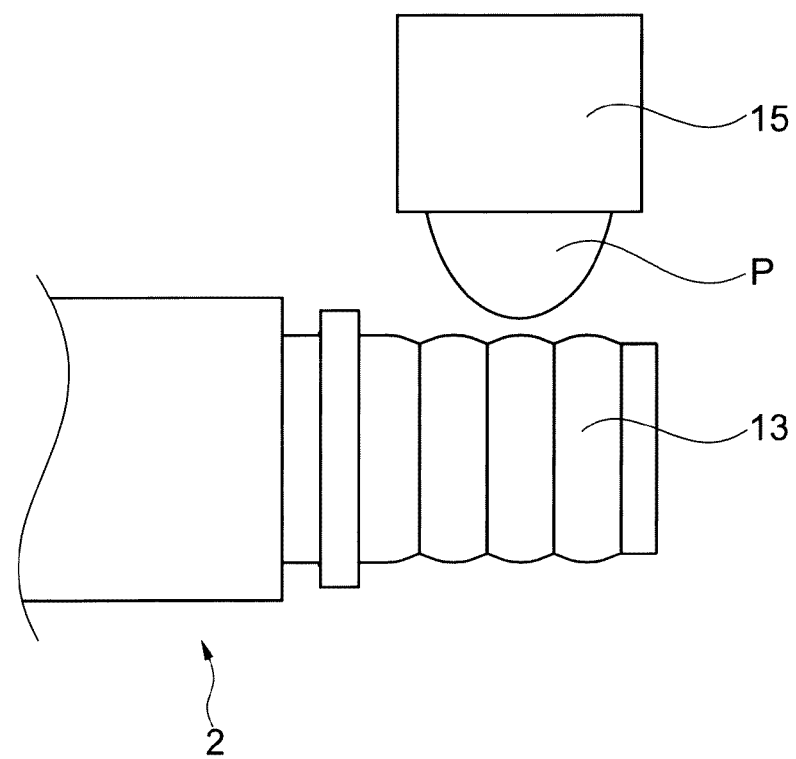
FIGS. 3A-B show two steps of the method according to the invention.

FIGS. 3A en 3B show two steps of the method according to the invention. In FIG. 3A the tubular body 2, 3 is provided and positioned near a plasma generating device 15. The plasma P generated by the plasma generating device 15 is brought in contact with the undulating surface 13 of the first end 2. By rotating the tubular body 2, 3 it is ensured that the full undulating surface 13 is subjected to the plasma treatment.

Figure 3B:
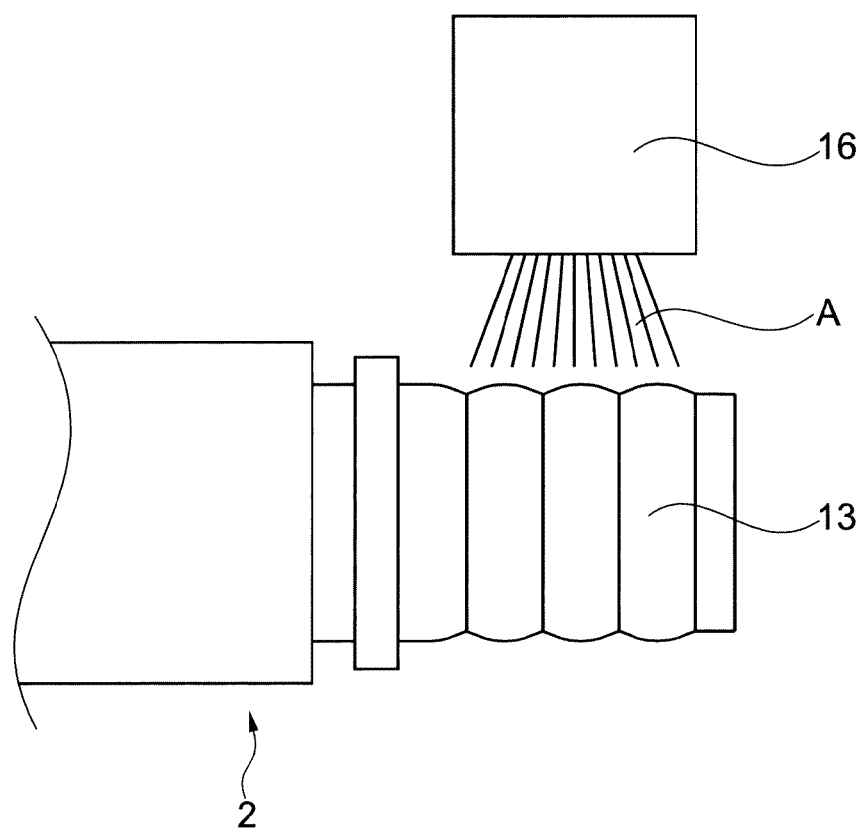

In FIG. 3B the plasma treated first end 2 of the tubular body 2, 3 is moved near an adhesive spray device 16, which sprays an adhesive A on the outer surface 13 to arrange an adhesive layer 14 to the outer surface 13.

After this step, the shrink sleeve 5 can be arranged to finish the manufacturing of the hose connection 1 according to the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A hose connection, comprising:
    a tubular body including a first end and a second end;
    a shrink sleeve arranged around the first end of the tubular body configured to clamp a hose end on the first end of the tubular body between the first end of the tubular body and the shrink sleeve;
    an adhesive layer arranged on an outer surface of the first end of the tubular body, the adhesive layer at least enveloping the first end in a tangential direction of the tubular body; and
    parallel annular ridges, arranged on the outer surface of the first end of the tubular body,
    wherein the outer surface of the first end and the parallel ridges together form curved undulations.

2. The connection of claim 1, wherein the adhesive layer extends on the outer surface along at least a length of the shrink sleeve.

3. The connection of claim 1, further comprising:
    a bushing, arranged against an internal surface of the first end of the tubular body.

4. The connection of claim 1, wherein the tubular body is injection molded.

5. The connection of claim 1, further comprising:
    an annular groove, arranged at a distance from an outer end of the first end of the tubular body,
    wherein the shrink sleeve includes a radial flange extending inwardly and into the annular groove.

6. The connection of claim 1, wherein a surface strength of the outer surface of the first end of the tubular body is at least $10^{-6}$ Nm (10 dyne·cm) greater than a surface strength of the adhesive layer.

7. A method for manufacturing the hose connection of claim 1, the method comprising:
    providing the tubular body;
    plasma treating the outer surface of the first end of the tubular body;
    coating the outer surface of the first end with an adhesive so as to provide the adhesive layer; and
    arranging the shrink sleeve around the first end of the tubular body.

8. The method of claim 7, wherein a surface strength of the outer surface of the first end of the tubular body after plasma treatment is at least $10^{-6}$ Nm (10 dyne·cm) greater than a surface strength of the adhesive layer.

9. A hose connection, comprising:
    a tubular body including a first end and a second end;
    a shrink sleeve arranged around the first end of the tubular body configured to clamp a hose end on the first end of the tubular body;
    an adhesive layer arranged on an outer surface of the first end of the tubular body, the adhesive layer at least enveloping the first end in a tangential direction of the tubular body;
    parallel annular ridges, arranged on the outer surface of the first end of the tubular body; and
    a bushing, arranged against an internal surface of the first end of the tubular body,
    wherein the outer surface of the first end and the parallel ridges together form curved undulations.

10. A hose connection, comprising:
    a tubular body including a first end and a second end;
    a shrink sleeve arranged around the first end of the tubular body configured to clamp a hose end on the first end of the tubular body;
    an adhesive layer arranged on an outer surface of the first end of the tubular body, the adhesive layer at least enveloping the first end in a tangential direction of the tubular body;
    parallel annular ridges, arranged on the outer surface of the first end of the tubular body; and
    an annular groove, arranged at a distance from an outer end of the first end of the tubular body,
    wherein the outer surface of the first end and the parallel ridges together form curved undulations, and
    wherein the shrink sleeve includes a radial flange extending inwardly and into the annular groove.

* * * * *